Feb. 1, 1944.       J. C. SETNICKA       2,340,569
FISH BAIT
Filed April 3, 1943
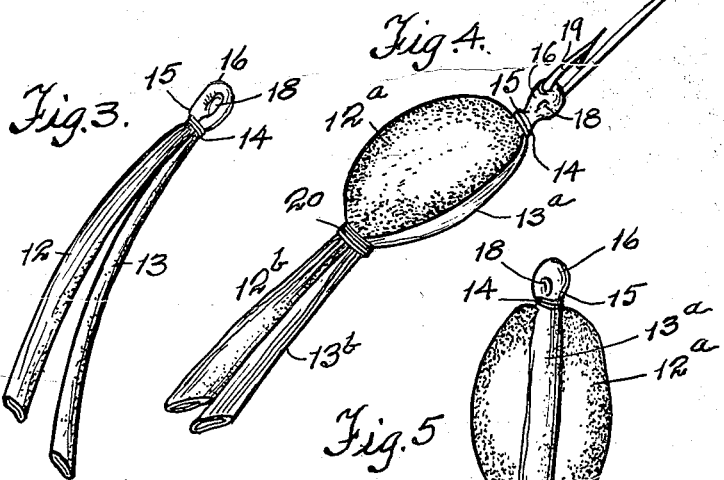
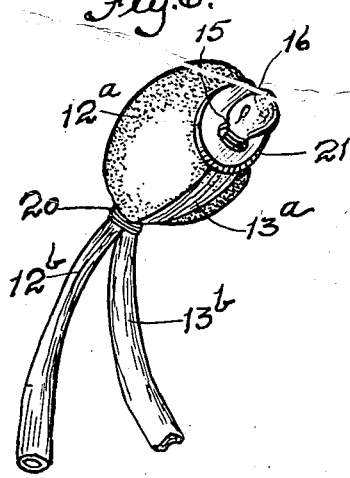
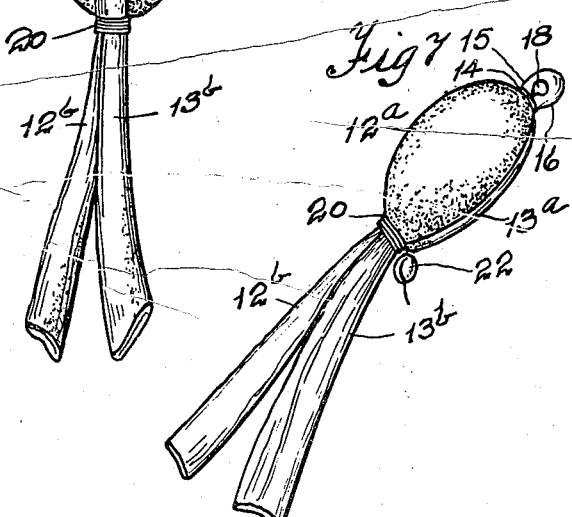
Inventor
John C. Setnicka
By Banning & Banning
Attorneys.

Patented Feb. 1, 1944

2,340,569

UNITED STATES PATENT OFFICE 2,340,569

FISH BAIT

John C. Setnicka, Cicero, Ill.

Application April 3, 1943, Serial No. 481,659

8 Claims. (Cl. 43—42)

The present invention is directed to a buoyant or floating bait which is intended to be drawn or jerked along the surface of the water in simulation of a live frog or other bait attractive to game fish, and the invention relates particularly to the construction of such a bait from a section of gut or intestine preferably of cattle, although other animal intestines or gut-like materials having similar properties might be used as a substitute therefor and are intended to be covered in the claims unless otherwise clearly indicated.

The tubular gut section is folded and in part inflated in such a way as to afford a distended body, a compacted head connected by a reduced neck with the body, an underlying keel or ballasting section and trailing legs or tails which may be animated by a jerky retrieving of the line so that a swimming movement is simulated. The bait may thus be constructed of an inexpensive tough material of animal origin which presents a very lifelike appearance both at rest and when in motion and which may be stored in brine or similar preservative for an indefinite period.

Further objects and details will appear from the following description in conjunction with the accompanying drawing in which:

Figure 1 is a side view of a section of gut adaptable for use in making the present bait;

Fig. 2 is a view showing the gut folded in preparation for binding and inflation;

Fig. 3 is a view showing the looped sections bound by a wrapping to provide a head and neck;

Fig. 4 is a perspective side view of the completed bait;

Fig. 5 is a bottom view of the same;

Fig. 6 is a forward view showing the neck surrounded by a collar where it is desirable to increase the weight or impart added movement to the bait; and Fig. 7 is a side view showing the use of split shot or the like to increase the weight where desirable.

The bait is constructed from a length 10 of gut which in the case of beef cattle comes from the slaughter house in diameters of from ¼ inch up and in lengths up to 150 feet or more. The gut is thin, tough, pliable and but slightly elastic and when properly preserved will last indefinitely.

The length 10 may be from 8 to 10 inches long and, for example, 1 inch in diameter when inflated, but the bait may vary in size within considerable limits depending on the use intended. The length 10 is looped at or near the middle around a stick or prong 11 for convenience in fabrication, which affords companion upper and lower sections 12 and 13 respectively, preferably of substantially equal length. The looped gut is then bound by a wrapping 14 just behind the loop which compacts the material to provide a reduced neck 15 and an enlarged, rounded head 16 with an eye or aperture 18. The barbed prong of a hook 19 may be inserted with its barbed point upwardly, through the material of the head so that the bait will not readily become detached.

The upper section 12 is next inflated either fully or partially to provide a rounded body 12a overlying a compacted keel section 13a which extends longitudinally beneath the center of the body and is bound thereto by a rear wrapping 20 which surrounds both sections of gut and seals the upper inflated section against the escape of air or gas. This leaves the terminal portions of the gut sections 12 and 13 as freely trailing tails 12b and 13b which being of thin pliable material will sway or move freely in the water.

Ordinarily the bait will be used without the addition of weights, but if desired and in order to increase the casting qualities of the bait, a weighted collar 21 in the nature of a washer or the like may be clamped around the neck or split shots 22 affixed to the ends of the rear wrapping as shown in Fig. 7, or expedients to secure the desired weight and balance or to vary the movements of the bait in the water or to lessen or even overcome its buoyancy.

In particular the collar 21 will serve the additional function of a chin piece to afford resistance to the water and cause diving or darting movements of a character well understood in the art. The natural color of the gut when inflated is of a pearly lustrous white and semitransparent so that it closely resembles the skin texture of a natural minnow, but the material may be readily stained to different colors which in some localities will improve its luring effect.

When floating upon the surface of the water, the underlying keel section will serve to ballast the bait and hold it upright and will also serve to reenforce and protect the belly of the bait while the trailing tails or legs, being limp, will swing or sway and when retrieved by a jerky tension on the line, will on each forward jerk tend to straighten out, and during the intervening periods of rest will tend to draw up or flex, thereby closely simulating the swimming movements of a frog, while the manner in which the bait rides the surface makes it practically weedless, while its relative softness and yieldability reduces the likelihood of its being rejected by the fish when its teeth encounter the surface of the bait.

The material from which the bait is constructed is extremely cheap, and the method of fabrication is one which reduces labor cost to a small figure so that the bait can be produced at a minimum of expense, and when tightly bound and properly preserved will maintain its inflated condition for long periods of time.

Although tubular sections of beef or other animal gut afford the ideal material from which to construct the bait of the present invention, it will be understood that substitutes, particularly those of animal or vegetable origin, or synthetics, and having gut-like properties, may be employed in a similar manner and are included under the term "gut-like." Also where I employ the term "air" in the claims I intend to cover and include any appropriate gaseous medium with which the body may be inflated.

I claim:

1. A fish bait composed of a length of tubular gut-like material folded at an intermediate point to afford two sections connected by a looped head, the sections being bound together behind the head with a forward wrapping to provide a reduced neck, said wrapping also serving to seal the forward end of one of the sections against escape of air, said sealed section being inflated and sealed by a rear wrapping to provide a distended body enclosing a volume of trapped air, and at least one of the sections being extended beyond the rear wrapping to provide a limp tail.

2. A fish bait composed of a length of tubular gut-like material folded at an intermediate point to afford two sections connected by a looped head, the sections being bound together behind the head with a forward wrapping to provide a reduced neck, said wrapping also serving to seal the forward end of one of the sections against escape of air, said sealed section being inflated and sealed by a rear wrapping to provide a distended body enclosing a volume of trapped air, and the two sections being extended beyond the rear wrapping to provide limp tails.

3. A fish bait composed of a length of tubular animal gut folded at an intermediate point to afford two sections connected by a looped head, the sections being bound together behind the head with a forward wrapping to provide a reduced neck, said wrapping also serving to seal the forward end of one of the sections against escape of air, said sealed section being inflated and sealed by a rear wrapping to provide a distended body enclosing a volume of trapped air, and at least one of the sections being extended beyond the rear wrapping to provide a limp tail.

4. A fish bait composed of a length of tubular animal gut folded at an intermediate point to afford two sections connected by a looped head, the sections being bound together behind the head with a forward wrapping to provide a reduced neck, said wrapping also serving to seal the forward end of one of the sections against escape of air, said sealed section being inflated and sealed by a rear wrapping to provide a distended body enclosing a volume of trapped air, and the two sections being extended beyond the rear wrapping to provide limp tails.

5. A fish bait composed of a length of tubular animal gut folded at an intermediate point to afford two sections connected by a looped head, the sections being bound together behind the head with a forward wrapping to provide a reduced neck, said wrapping also serving to seal the forward end of one of the sections against escape of air, said sealed section being inflated and sealed by a rear wrapping to provide a distended body enclosing a volume of trapped air, the other section being deflated and compacted to underlie the body in the form of a longitudinally extending keel and engaged by the rear wrapping and both of the sections being extended beyond the rear wrapping to provide limp trailing tails.

6. A fish bait composed of a length of tubular gut-like material folded at an intermediate point to afford two sections connected by a looped head, the sections being bound together behind the head with a forward wrapping to provide a reduced neck, said wrapping also serving to seal the forward end of one of the sections against escape of air, said sealed section being inflated and sealed by a rear wrapping to provide a distended body enclosing a volume of trapped air, the other section being deflated and compacted to underlie the body in the form of a longitudinally extending keel and engaged by the rear wrapping and both of the sections being extended beyond the rear wrapping to provide limp trailing tails.

7. A fish bait composed of a length of tubular gut-like material folded at an intermediate point to afford two sections connected by a looped head, the sections being bound together behind the head with a forward wrapping to provide a reduced neck, said wrapping also serving to seal the forward end of one of the sections against escape of air, said sealed section being inflated and sealed by a rear wrapping to provide a distended body enclosing a volume of trapped air, the other section being deflated and compacted to underlie the body in the form of a longitudinally extending keel and engaged by the rear wrapping and both of the sections being extended beyond the rear wrapping to provide limp trailing tails, and a resistance collar surrounding the neck and adapted to impinge against the water to modify the action of the bait.

8. A fish bait composed of a length of tubular gut-like material having compression means applied thereto at separate front and rear points for sealing the intermediate portion of said length against escape of air, said intermediate portion being inflated and held in distended condition by a volume of trapped air, the forward end of the length of material in advance of the forward compression means affording a head adapted to receive a hook, and the length of material behind the rear compression means being collapsed and extended to afford a limp trailing tail.

JOHN C. SETNICKA.